(12) United States Patent
Desorcy et al.

(10) Patent No.: US 10,165,740 B2
(45) Date of Patent: Jan. 1, 2019

(54) TREE SAP COLLECTING DEVICE

(71) Applicant: ERATUBE INC., Saint-Hyacinthe (CA)

(72) Inventors: Raynald Desorcy, Saint-Hyacinthe (CA); Yanick Dozois, La Présentation (CA)

(73) Assignee: ERATUBE INC., Saint-Hyacinthe (CA)

( * ) Notice: Subject to any disclaimer, the term of this patent is extended or adjusted under 35 U.S.C. 154(b) by 167 days.

(21) Appl. No.: 14/955,574

(22) Filed: Dec. 1, 2015

(65) Prior Publication Data
US 2016/0165816 A1 Jun. 16, 2016

Related U.S. Application Data

(60) Provisional application No. 62/090,685, filed on Dec. 11, 2014.

(51) Int. Cl.
*A01G 23/00* (2006.01)
*A01G 23/14* (2006.01)

(52) U.S. Cl.
CPC .................. *A01G 23/14* (2013.01)

(58) Field of Classification Search
CPC ......... A01G 23/10; A01G 23/12; A01G 23/14
USPC .............................................. 47/54
See application file for complete search history.

(56) References Cited

U.S. PATENT DOCUMENTS

| | | | |
|---|---|---|---|
| 833,081 A | 10/1906 | McVoy | |
| 2,944,369 A | 7/1960 | Soule | |
| 3,046,698 A * | 7/1962 | Breen | A01G 23/14 248/68.1 |
| 3,057,115 A | 10/1962 | Frank | |
| 3,304,654 A | 2/1967 | Reynolds | |
| 3,706,161 A * | 12/1972 | Jenson | A01G 7/06 47/57.5 |
| 4,299,053 A | 11/1981 | Foote | |
| 4,366,648 A | 1/1983 | Morin | |
| 4,512,104 A | 4/1985 | Lamb | |
| 4,884,365 A * | 12/1989 | Lesquir | A01G 23/14 47/52 |
| 4,887,387 A * | 12/1989 | Lesquir | A01G 23/14 47/52 |
| 4,926,597 A * | 5/1990 | Landry | A01G 23/14 239/272 |

(Continued)

FOREIGN PATENT DOCUMENTS

| CA | 1096637 | 3/1981 |
|---|---|---|
| CA | 1290944 | 10/1991 |

(Continued)

*Primary Examiner* — Monica L Williams
*Assistant Examiner* — Aaron M Rodziwicz
(74) *Attorney, Agent, or Firm* — Norton Rose Fulbright Canada LLP

(57) ABSTRACT

A tree sap collecting device having at least one hollow main conduit extending between a first end adapted to be inserted into a tree and a second end. The main conduit has an external surface and at least one protuberance extending outwardly from the external surface. The at least one protuberance occupies a circumferential extent on the external surface that is less than a circumference of the external surface. The at least one protuberance engages a collection tube upon said collection tube being mounted to the external surface.

18 Claims, 3 Drawing Sheets

(56) References Cited

U.S. PATENT DOCUMENTS

| | | | |
|---|---|---|---|
| 5,224,289 A * | 7/1993 | Buzzell | A01G 23/14 285/361 |
| 5,303,504 A | 4/1994 | Buzzell | |
| 5,564,227 A | 10/1996 | Chabot | |
| 6,438,895 B1 | 8/2002 | Fortier | |
| D501,040 S | 1/2005 | Gieson | |
| 8,677,682 B2 | 3/2014 | Cote | |
| 2003/0047940 A1 | 3/2003 | Desorcy | |
| 2005/0000153 A1* | 1/2005 | White | A01G 23/14 47/11 |
| 2010/0170152 A1* | 7/2010 | Perkins | F16K 15/04 47/52 |
| 2011/0173880 A1 | 7/2011 | Perkins | |
| 2011/0173881 A1 | 7/2011 | Perkins | |
| 2011/0285126 A1* | 11/2011 | Jahan | B05B 1/044 285/305 |
| 2013/0174478 A1* | 7/2013 | Cote | A01G 23/10 47/11 |
| 2016/0278309 A1* | 9/2016 | Emery | A01G 23/14 |

FOREIGN PATENT DOCUMENTS

| | | | |
|---|---|---|---|
| CA | 2224908 | 6/1999 | |
| CA | 2224908 A1 * | 6/1999 | ............. A01G 23/14 |
| CA | 2233739 A1 * | 9/1999 | ............. A01G 23/14 |
| CA | 2260495 A1 * | 7/2000 | ............. A01G 23/14 |
| CA | 2275731 A1 * | 12/2000 | ............. A01G 23/14 |
| CA | 2162826 | 1/2002 | |
| CA | 2439494 A1 * | 3/2004 | ............. A01G 23/14 |
| CA | 2418298 | 8/2004 | |
| CA | 2418298 A1 * | 8/2004 | ............. A01G 23/14 |
| CA | 2479982 A1 * | 3/2005 | ............. A01G 23/14 |
| CA | 2681732 A1 * | 12/2009 | ............. A01G 23/14 |
| CA | 2659789 A1 * | 3/2010 | ............. A01G 23/14 |
| CA | 2658916 A1 * | 9/2010 | ............. A01G 23/14 |
| CA | 2753155 A1 * | 3/2013 | ............. A01G 23/14 |
| CA | 2848568 A1 * | 10/2015 | ............. A01G 23/14 |
| CA | 2855396 A1 * | 12/2015 | ............. F16L 41/12 |
| CA | 2924438 A1 * | 9/2016 | ............. A01G 23/14 |
| CA | 2945767 A1 * | 4/2017 | ............. A01G 23/14 |
| FR | 2774257 A1 * | 8/1999 | ............. A01G 23/10 |
| KR | 20100047373 | 10/2008 | |

* cited by examiner

TREE SAP COLLECTING DEVICE

CROSS-REFERENCE TO RELATED APPLICATIONS

This application claims priority to US provisional patent application having application Ser. No. 62/090,685 and filed Dec. 11, 2014, the entire contents of which are hereby incorporated by reference.

TECHNICAL FIELD

The application relates generally to devices for collecting and conveying liquids and, more particularly, to a device for collecting sap from a tree.

BACKGROUND OF THE ART

In northern climes, the sap from trees, such as maple trees, is harvested in the springtime and made into edible fluids and substances. Different types of taps and spouts are used to harvest the sap from the tree.

In larger operations, multiple trees are tapped and a sap-collection circuit is formed by running tubing between each tap and a central sap-collecting location. The productivity of such operations depends in part on the tubing remaining on the tap throughout the sap-collecting season. When a tube comes off its tap, the sap from that tree is not harvested and is essentially wasted. In large operations where many trees are tapped, it can be difficult for an operator to locate the tubes which become separated from their taps. This can result in a significant amount of sap not being collected.

Tubes can come off their taps for a variety of reasons. One common reason is that the tubes rotate about the exterior of the tap and slip off the tap. This rotation of the tubes can be caused by handling, movements in the tubing, the elements, negative pressure in the sap-collecting circuit, etc.

SUMMARY

In one aspect, there is provided a tree sap collecting device, comprising: a main conduit extending between a first end insertable into a tree and a second end, the main conduit being hollow along at least some of a length thereof and defining an inner chamber extending from the first end toward the second end to receive sap; and a hollow drainage conduit connected to the main conduit and extending away therefrom, the drainage conduit being in fluid communication with the inner chamber of the main conduit to receive sap therefrom, the drainage conduit having an outer surface and at least one protuberance extending outwardly from the outer surface, the at least one protuberance occupying a circumferential extent on the outer surface being less than a circumference of the outer surface, the at least one protuberance engaging a collection tube upon the collection tube being mounted to the outer surface.

In another aspect, there is provided a tree sap collecting kit, comprising: at least one collection tube; and a collecting device having: a main conduit extending between a first end insertable into a tree and a second end, the main conduit being hollow along at least some of a length thereof and defining an inner chamber extending from the first end toward the second end to receive sap; and a hollow drainage conduit connected to the main conduit and extending away therefrom, the drainage conduit being in fluid communication with the inner chamber of the main conduit to receive sap therefrom, the drainage conduit having an outer surface and at least one protuberance extending outwardly from the outer surface, the at least one protuberance occupying a circumferential extent on the outer surface being less than a circumference of the outer surface, the at least one protuberance engaging said collection tube upon said collection tube being mounted to the outer surface.

In a further aspect, there is provided a tree sap collecting device, comprising: a hollow main conduit extending between a first end adapted to be inserted into a tree and a second end, the main conduit having an external surface and at least one protuberance extending outwardly from the external surface, the at least one protuberance occupying a circumferential extent on the external surface being less than a circumference of the external surface, the at least one protuberance engaging said collection tube upon said collection tube being mounted to the external surface.

In yet a further aspect, there is provided a method for collecting sap from a tree, comprising: inserting a hollow conduit into the tree; securing a collection tube to an end of the conduit by frictionally engaging the collection tube with at least one protuberance on an external surface of the conduit, the at least one protuberance occupying a circumferential extent on the external surface being less than a circumference of the external surface; and draining sap from the tree via the conduit.

DESCRIPTION OF THE DRAWINGS

Reference is now made to the accompanying figures in which.

DETAILED DESCRIPTION

Figure 1A:
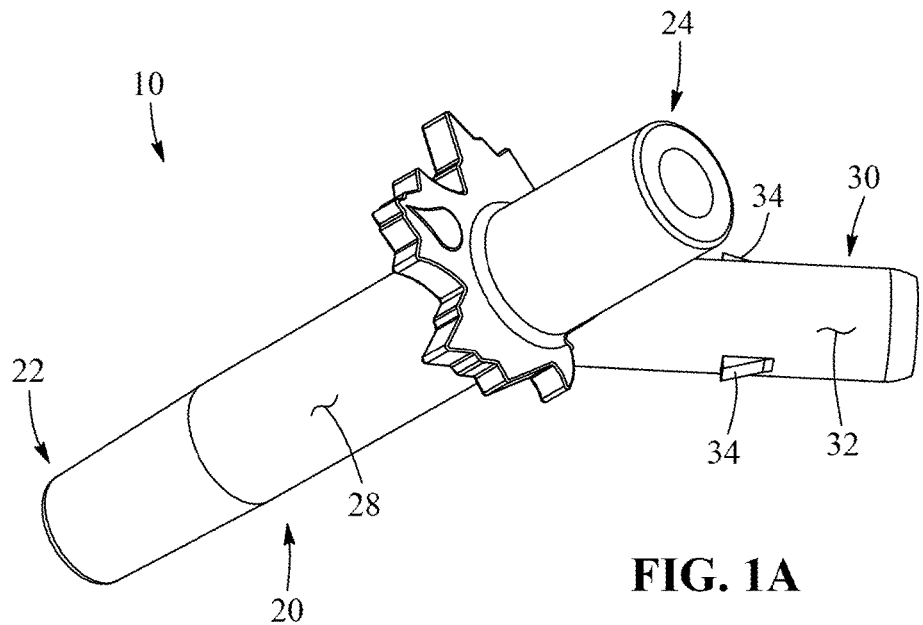
FIG. 1A is a perspective view of a tree sap collecting device, according to an embodiment of the present disclosure.
Figure 1B:
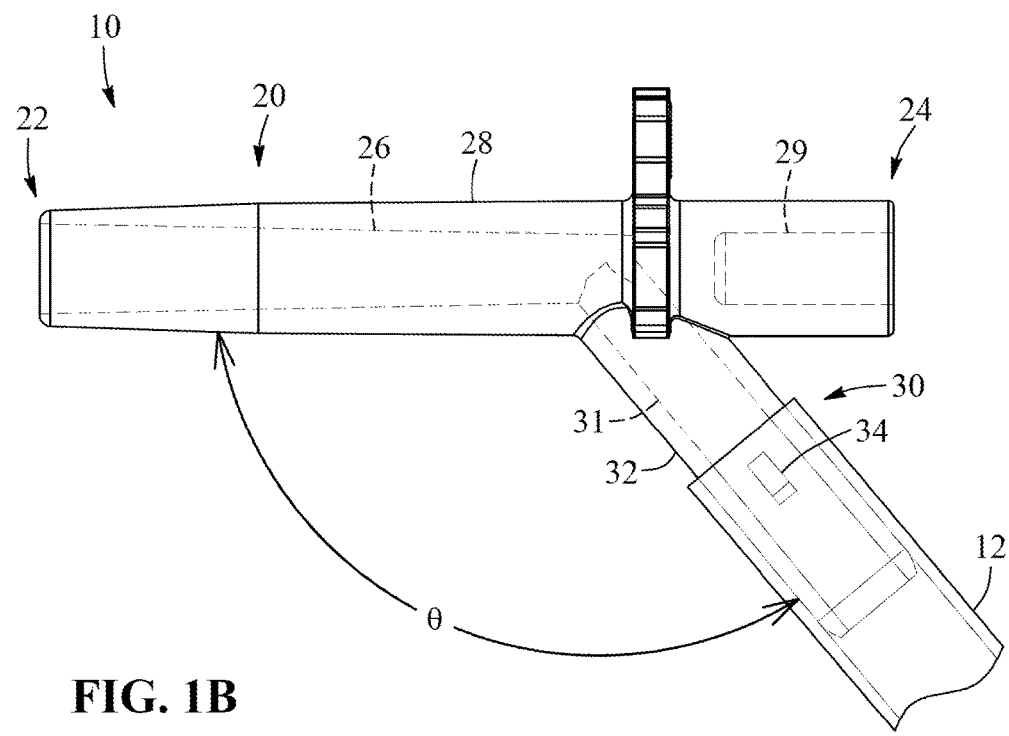
FIG. 1B is a side view of the tree sap collecting device of FIG. 1A.

FIGS. 1A and 1B illustrate a tree sap collecting device 10 for collecting sap from a tree. The tree sap collecting device 10 (or simply "device 10") can be inserted into a tree and engage a sap-carrying vein of the tree. Under appropriate environmental conditions, sap will flow from the vein and into the device 10. The device 10 may then convey the sap to a collection device, such as bucket hanging therefrom or a collection line. It can thus be appreciated that the device 10 can be any spout, tap, or other similar object which can achieve such functionality.

In larger sap-collecting operations, one or more collection tubes 12 can be mounted to, and removed from, each device 10. Each collection tube 12 may be a clear or opaque plastic tube which drains the sap from the device 10 and transports it to a central collection area where the sap can be further processed. The collection tube 12 is a separate component connected to the device 10, often before the device 10 is inserted into the tree.

As will be explained in greater detail below, the device 10 helps to ensure that a sap collection tube will remain attached thereto in order to minimise the occurrences of the collection tube falling off the device 10. Therefore, the device 10 contributes to improving the harvest of tree sap by reducing the likelihood that sap will be wasted when the collection tube falls off. When many trees are being harvested (e.g. thousands or tens of thousands), such incremental gains in sap collection can result in significant overall sap volumes that might otherwise have been uncollected.

The device 10 has a main conduit 20 which is adapted to be inserted into the tree to receive sap therefrom. The embodiment of the device 10 in FIGS. 1A and 1B also has a drainage conduit 30 which is in fluid communication with the main conduit 20 to receive sap therefrom, and to convey the sap to the collection tube 12.

The main conduit 20 extends between a first end 22 adapted to be inserted into the tree, and a remote second end 24 which is located on the opposite extremity of the main conduit 20 as the first end 22. The main conduit 20 is a tube which is hollow along at least part of its length. The hollow interior of the main conduit 20 forms an inner chamber 26. The extent and configuration of the hollow interior, and thus of the inner chamber 26, can vary.

For example, in the embodiment of FIGS. 1A and 1B, the inner chamber 26 can begin at the first end 22 and extend toward the second end 24 but stop short thereof at the drainage conduit 30. Stated differently, the main conduit 20 can be hollow only along some of its length, such as along the section between the first end 22 and the drainage conduit 30, as shown in FIG. 1B. This allows the sap to enter the inner chamber 26 via the first end 22 of the main conduit 20, and to exit the inner chamber 26 via the drainage conduit 30.

The inner chamber 26 can also be tapered along its length. More particularly, the cross-sectional area of the inner chamber 26 can vary along its length. In FIG. 1B, the cross-sectional area of the inner chamber 26 is largest at the first end 22, and decreases along the length of the inner chamber 26 away from the first end 22 toward the second end 24. The varying cross-sectional area of the inner chamber 26 may help to improve the flow of the liquid sap within the main conduit 20.

An external surface 28 of the main conduit 20 may also be tapered along some of its length. More particularly, the cross-sectional area of the external surface 28 can vary along its length. For example, and as shown in FIG. 1B, the cross-sectional area of the external surface 28 can vary along the length near the first end 22. It may be smallest at the extremity of the main conduit 20 inserted into the tree, and increases in the direction of the second end 24. This creates a tapered first end 22, which can be easier to insert into the tree.

The second end 24 facilitates the insertion of the first end 22 into the tree. More particularly, the first end 22 of the main conduit 20 can be inserted into the tree when a user applies a driving force to the second end 24. This can be accomplished using a hammer, for example. In order to resist the stresses caused by such a driving force, the structural rigidity of the second end 24 can be reinforced. For example, the second end 24 can be solid along its length and have no hollow portions. Alternatively, and as shown in FIG. 1B, the second end 24 can have a hollow portion 29 along some of its length. Such a hollow portion 29 can have a cross-sectional area that is less than that of the inner chamber 26, irrespective of whether the inner chamber 26 is continuous with the hollow portion 29 or distinct therefrom. Stated differently, the hollow portion 29 can be thicker than the remainder of the main conduit 20 because it may be struck by a hammer or other force driver. Such a hollow portion 29 also reduces the amount of material required to make the device 10. This reduction in material can reduce the manufacturing costs for the device 10, particularly during large production runs (e.g. thousands or tens of thousands) of the device 10.

For the device 10 of FIGS. 1A and 1B, it is desirable to have a conduit whose sole purpose is to drain the sap from the device 10, and which is not driven into the tree. This is the case with the hollow drainage conduit 30, which is connected to the main conduit 20 and extends away therefrom. The drainage conduit 30 receives sap from the main conduit 20 and conveys it away from the device 10 for collection. When the device 10 is installed in the tree, the drainage conduit 30 is generally oriented toward the ground so as to convey sap via gravity, which further facilitates draining the sap.

The drainage conduit 30 engages with the main conduit 20, and more particularly, with the inner chamber 26 of the main conduit 20. The hollow interior 31 of the drainage conduit 30 is therefore in fluid communication with the inner chamber 26 of the main conduit 20, and can receive the sap therefrom. The intersection of the drainage conduit 30 and the main conduit 20 can vary. For example, the axis of the drainage conduit 30 can intersect the axis of the main conduit 20 at an angle θ. The angle θ can be any suitable angle between 0 and 180 degrees. In most instances, the angle θ will be greater than 90 degrees to reduce the likelihood of blockages forming at the intersection of the main conduit 20 and the drainage conduit 30. For example, and as shown in FIG. 1B, the angle θ is about 130 degrees.

Still referring to FIGS. 1A and 1B, one or more discrete or stand-alone protuberances 34 are located on an outer surface 32 of the drainage conduit 30. Each protuberance 34 extends outwardly from the outer surface 32 of the drainage conduit 30, and occupies a circumferential extent of surface area on the outer surface 32 which is less than the entire circumference of the drainage conduit 30. Stated differently, each protuberance 34 does not form a continuous extension along the entire circumference of the drainage conduit 30, in contrast to conventional annular friction rings which extend around the entire conduit. Therefore, in the embodiments of the device 10 having two or more protuberances 34, each protuberance 34 is a discontinuous projection extending from the outer surface 32. This configuration of one or more protuberance 34 reduces the amount of material required to manufacture the device 10, particularly when compared to conventional annular friction rings. This reduction in materials can reduce the manufacturing costs for the device 10, particularly during large production runs (e.g. thousands or tens of thousands) of the device 10. This configuration of one or more protuberances 34 may also enhance the frictional engagement between the drainage conduit 30 and the collection tube 12, as explained in further detail below.

Each protuberance 34 acts as grip or friction enhancers, and increases the frictional contact between the outer surface 32 of the drainage conduit 30 and the inner surface of a collection tube 12 mated therewith, so that the collection tube 12 is secured to the drainage conduit 30. In the embodiments where there are more than one protuberance 34, each protuberance 34 is spaced apart from another protuberance 34 on the outer surface 32. More particularly, each protuberance 34 is separate and discontinuous from another protuberance 34. In most instances, the drainage conduit 30 is a cylindrical tube. The protuberances 34 may therefore be circumferentially spaced apart along the periphery of the outer surface 32.

Figure 2A:
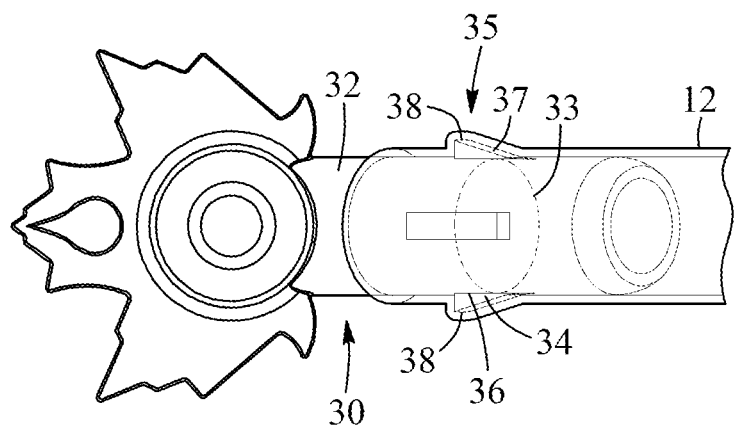
FIG. 2A is rear view of a tree sap collecting device, according to another embodiment of the present disclosure.
Figure 2B:
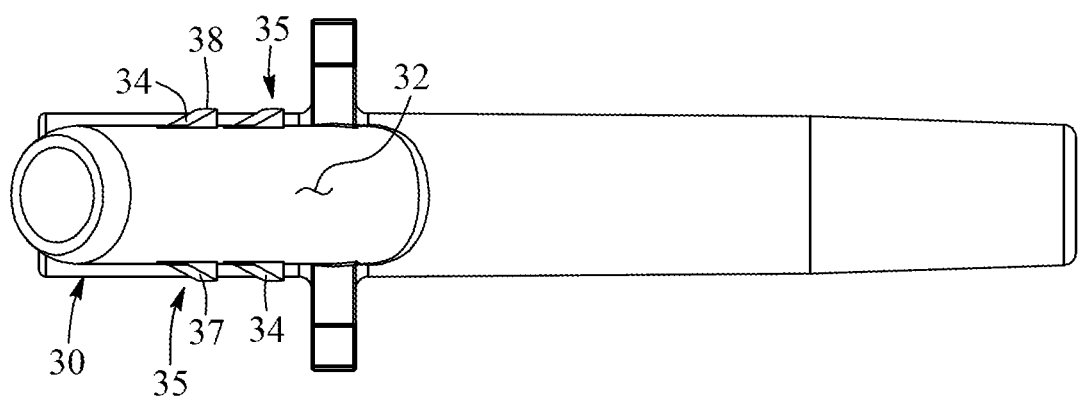
FIG. 2B is a bottom view of a tree sap collecting device, according to yet another embodiment of the present disclosure.

The spacing of the protuberances 34 can vary, as can be seen in FIGS. 2A and 2B. For example, and referring to FIG. 2A, the protuberances 34 may be circumferentially spaced apart from one another and lie on the circumferential periphery of the same transverse cross-sectional plane 33 of the drainage conduit 30. In another possible configuration, the protuberances 34 may be circumferentially spaced apart from one another on the outer surface 32, and axially offset set from one another along the length of the drainage conduit 30. In yet another possible configuration, multiple sets 35 of circumferentially spaced-apart protuberances 34 can be provided on the outer surface 32, each set 35 being longitudinally or axially spaced apart from an adjacent set 35 along the length of the drainage conduit 30. The protuberances 34 can therefore be any arrangement of discrete projections on the outer surface 32 of the drainage conduit 30. As shown in FIGS. 1A, 1B, and 2B, the only surface projections, bumps, or protrusions along the length of the outer surface 32 of the drainage conduit 30 are the protuberances 34. The outer surface 32 of the drainage conduit 30 is thus smooth. The outer surface 32 of the drainage conduit 30 is thus free of any protrusions except for the protuberances 34.

Each protuberance 34 is a discrete friction enhancer which engages the collection tube 12 and prevents it from rotating or spinning about itself on the outer surface 32 of the drainage conduit 30. In reducing and/or eliminating this rotational movement, the protuberance 34 therefore help the collection tube 12 to remain connected to the drainage conduit 30 throughout the duration of the sap-collecting season, and longer if necessary. There can therefore be any number of protuberances 34 on the outer surface 32, and each protuberance 34 can take many shapes and configurations to achieve such functionality. Some of these arrangements are now described.

FIG. 2A shows a set 35 of two protuberances 34 on the outer surface 32. Each protuberance 34 in the set 35 is disposed diametrically opposite to the other protuberance 34 on the outer surface 32. Each protuberance 34 is shaped to engage the inner surface of the collection tube. Each protuberance 34 may be a triangular prism with a base surface 36 connected to the outer surface 32 and an inclined surface 37 at least part of which engages the collection tube 12. The inclined surface 37 forms an angle with the outer surface 32, and is inclined along the direction of the central axis of the drainage conduit 30 toward the main conduit 20. The inclined surface 37 ends at an engagement edge 38, which engages with the inner surface 12 of the collection tube. The orientation of the inclined surface 37 against the direction of removal of the collection tube allows the engagement edge 38 to counteract the tendency of the collection tube to slide off the drainage conduit 30.

It will therefore be appreciated that the number of protuberances 34 on the outer surface 32 of the drainage conduit 30, their position with respect to one another, and their individual shapes or combination of individual shapes, can vary. Each of the protuberances 34 can also be textured or profiled to increase its frictional contact with the collection tube.

Figure 2C:
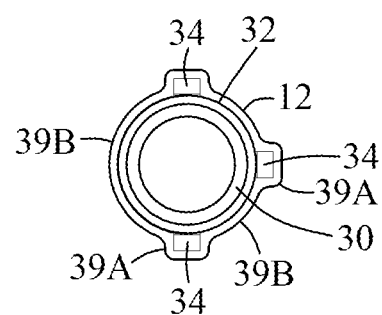
FIG. 2C is an end view of a drainage conduit of a tree sap collecting device, according to yet another embodiment of the present disclosure.

Referring to FIG. 2C, each protuberance 34 may engage the material of the collection tube 12 and elastically deform it along a radial direction at the point of engagement. In the spaces on the outer surface 32 between the protuberances 34, the material of the collection tube is not elastically deformed in the same way. This arrangement of elastically deformed sections 39A and non-deformed sections 39B of the collection tube 12 is observed to reduce or eliminate instances of the collection tube 12 rotating about the outer surface 32, thereby helping to better secure the collection tube 12 to the drainage conduit 30. In contrast, a single annular projection extending continuously around the outer surface of some conventional taps does not create this arrangement of elastically deformed and non-deformed sections of the collection tube, and may thus be more likely to rotate about the tap and fall off. Although shown in FIG. 2C with multiple protuberances 34, it will be appreciated that the elastically deformed and non-deformed sections 39A, 39B can be formed even with a drainage conduit 30 having one protuberance 34.

Figure 3:
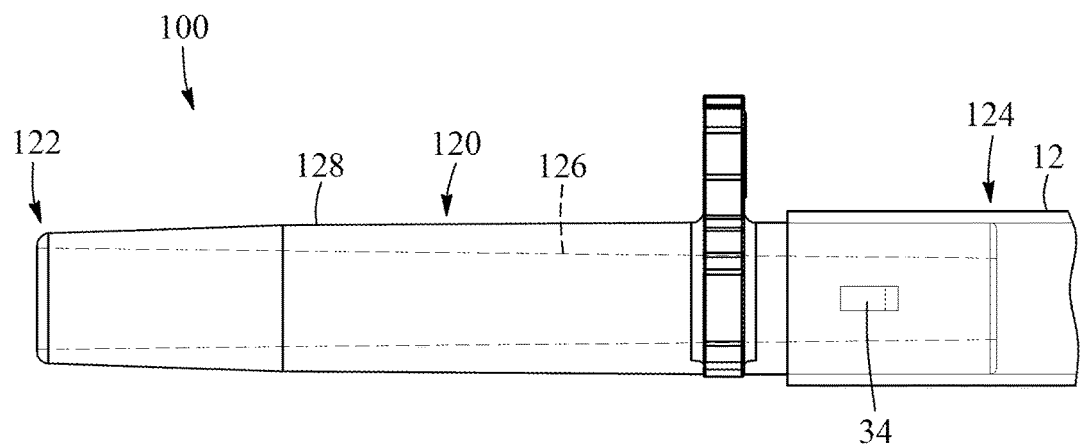
FIG. 3 is a side view of a tree sap collecting device, according to yet another embodiment of the present disclosure.

FIG. 3 shows another embodiment of the device 100 having only one conduit, or a hollow main conduit 120. In this embodiment of the device 100, the inner chamber 126 extends along the entire length of the main conduit 120 between its first end 122 and its second end 124. This allows the sap to enter the inner chamber 126 via the first end 122 of the main conduit 120, and to exit the inner chamber 126 via the collection tube 12 mounted to the second end 124. It will be appreciated that the protuberances 34 of the device 100 can be spaced, shaped, and numbered on the external surface 128 of the main conduit 120 similarly to the protuberances 34 described above on the outer surface of the drainage conduit.

Figure 4:
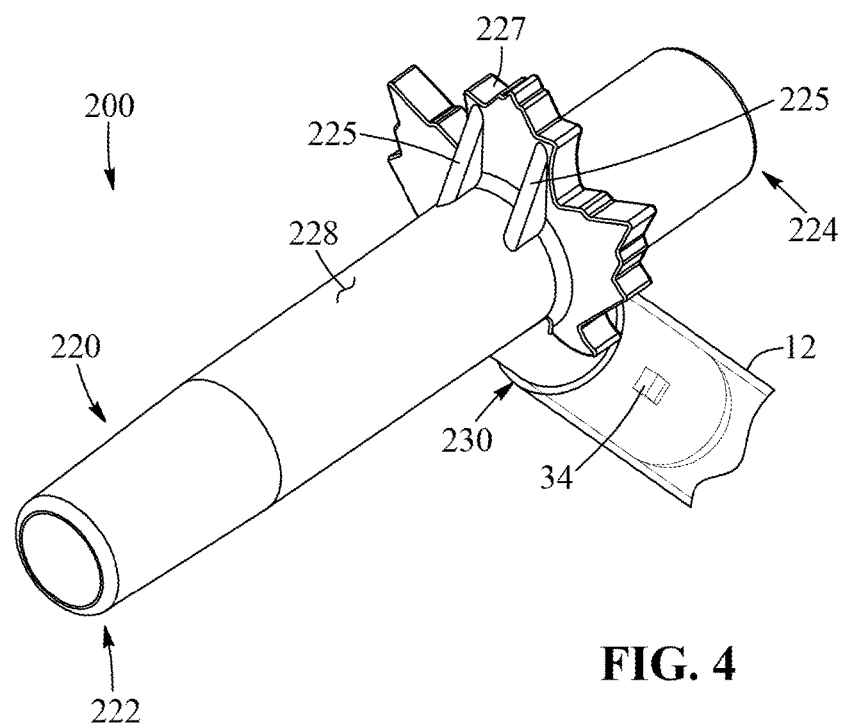
FIG. 4 is a side view of a tree sap collecting device, according to yet another embodiment of the present disclosure.

FIG. 4 shows yet another embodiment of the device 200 having a gripping member 227. The gripping member 227 can be located between the first and second ends 222, 224 and is a body protruding from the external surface 228 of the main conduit 220. It can be seized by a user when the device 200 is inserted into the tree. More particularly, the user can hold the device 200 by the gripping member 227 and drive the device 200 into the tree by hammering the second end 224. The gripping member 227 helps the user to better grasp the device 200 while it is being hammered, and may also protect the fingers of the user from being hit by the hammer. Once the device 200 is inserted into the tree, the gripping member 227 also helps the user to seize the device 200 to remove it from the tree. The gripping member 227 can also serve as an arresting device to stop the displacement of the device 200 into the tree beyond a certain length of the main conduit 220. The gripping member 227 can therefore be any object extending away from the external surface 228 along a peripheral length thereof, and is not limited to the maple leaf shape shown in the figures.

The device 200 may also include one or more support plates 225 extending between the gripping member 227 and the external surface 228 of the main conduit 220. The support plates 225 structurally support the gripping member 227 so that it can resist the loads being imposed on it when it the device 200 is manipulated by the user via the gripping member 227. More particularly, the support plates 225 help to reinforce the gripping member 227 and prevent it from collapsing against the external surface 228 if it is gripped to hard by the user.

The device and/or its components described herein can be made of any suitable material, such as plastic, metals, wood, etc. In most instances, the device is manufactured by a molding process, such as by a polymer injection molding process. Furthermore, although the main conduit and the drainage conduit are described herein as separate components, it will be appreciated that they may be integral with one another. Indeed, the main and drainage conduits and/or any components of the device can be integrally formed by a polymer injection molding process.

There is also disclosed herein a method for collecting sap from a tree. The method includes inserting a hollow conduit, such as the main conduit described above, into the tree. The method also includes securing a collection tube to an end of the conduit by frictionally engaging the collection tube with one or more protuberances on an external surface of the conduit. Each protuberance occupies a circumferential extent on the external surface being less than a circumference of the external surface. The method also includes draining sap from the tree via the conduit, either via gravity or with a vacuum-assisted draining system.

Returning now to 4, the installation and use of the device 200 is further explained. A tap hole is made in the tree, and the user manipulates the device 200 with the gripping member 227 to position the first end 222 to be inserted into the tap hole. The user hammers the second end 224 to drive the first end 222 into the tap hole. The main conduit 220 is driven into the tree as far as is desired. The collection tube 12 is slide over the outer surface of the drainage conduit 230. The protuberances 34 engage the inner surface of the collection tube 12, thereby securing the collection tube 12 to the device 200. Sap can therefore begin to flow from within the tree to the collection tube 12 via the device 200, either through gravitational drainage or with the assistance of a vacuum recovery system.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A tree sap collecting device, comprising:
a main conduit extending between a first end insertable into a tree and a second end, the main conduit being hollow along at least some of a length thereof and defining an inner chamber extending from the first end toward the second end to receive sap; and
a hollow drainage conduit connected to the main conduit and extending away therefrom, the drainage conduit being in fluid communication with the inner chamber of the main conduit to receive sap therefrom, the drainage conduit having an outer surface and at least one protuberance extending outwardly from the outer surface, the at least one protuberance occupying a circumferential extent on the outer surface being less than a circumference of the outer surface, the outer surface being free of protrusions except for the at least one protuberance, the at least one protuberance engaging a collection tube upon the collection tube being mounted to the outer surface, the at least one protuberance locally radially deforming the collection tube upon the collection tube being mounted to the outer surface, a remainder of the collection tube remaining non-deformed so as to form deformed sections and non-deformed sections of the collection tube, an arrangement of the deformed sections and the non-deformed sections configured to reduce rotation of the collection tube about the outer surface of the drainage conduit to thereby better secure the collection tube to the drainage conduit.

2. The collecting device of claim 1, wherein the at least one protuberance includes a plurality of protuberances, each protuberance being circumferentially spaced apart on the outer surface.

3. The collecting device of claim 2, wherein each protuberance is circumferentially aligned along a circumferential periphery line lying on a transverse cross-sectional plane of the drainage conduit.

4. The collecting device of claim 2, wherein each protuberance is axially offset set from one another along a length of the drainage conduit.

5. The collecting device of claim 2, wherein the plurality of protuberances includes two protuberances, each protuberance being disposed on the outer surface diametrically opposite to the other protuberance.

6. The collecting device of claim 2, further comprising a plurality of sets of circumferentially spaced-apart protuberances, each set of protuberances being axially offset from an adjacent set along a length of the drainage conduit.

7. The collecting device of claim 1, wherein each protuberance is a triangular prism having a base surface attached to the outer surface of the drainage conduit and an inclined surface forming an angle with the outer surface, the inclined surface having a distal engagement edge engaging an inner surface of the collection tube upon the collection tube being mounted to the outer surface.

8. The collecting device of claim 7, wherein the inclined surface is inclined along a direction being against a direction of removal of the collection tube from the outer surface.

9. The collecting device of claim 1, wherein a cross-sectional area of the inner chamber decreases along a length thereof away from the first end of the main conduit.

10. A tree sap collecting device, comprising: a hollow main conduit extending between a first end adapted to be inserted into a tree and a second end, the main conduit having an external surface and at least one protuberance extending outwardly from the external surface, the at least one protuberance occupying a circumferential extent on the external surface being less than a circumference of the external surface, the external surface being free of protrusions except for the at least one protuberance, the at least one protuberance engaging a collection tube upon the collection tube being mounted to the external surface, the at least one protuberance locally radially deforming the collection tube upon the collection tube being mounted to the external surface, a remainder of the collection tube remaining non-deformed so as to form deformed sections and non-deformed sections of the collection tube, an arrangement of the deformed sections and the non-deformed sections configured to reduce rotation of the collection tube about the external surface of the drainage conduit to thereby better secure the collection tube to the drainage conduit.

11. The collecting device of claim 10, wherein the at least one protuberance includes a plurality of protuberances, each protuberance being circumferentially spaced apart on the external surface.

12. The collecting device of claim 11, wherein each protuberance is circumferentially aligned along a circumferential periphery line lying on a transverse cross-sectional plane of the main conduit.

13. The collecting device of claim 11, wherein each protuberance is axially offset set from one another along a length of the main conduit.

14. The collecting device of claim 11, wherein the plurality of protuberances includes two protuberances, each protuberance being disposed on the external surface diametrically opposite to the other protuberance.

15. The collecting device of claim 11, further comprising a plurality of sets of circumferentially spaced-apart protuberances, each set of protuberances being axially offset from an adjacent set along a length of the main conduit.

16. The collecting device of claim 10, wherein each protuberance is a triangular prism having a base surface attached to the external surface of the main conduit and an inclined surface forming an angle with the external surface, the inclined surface having a distal engagement edge engaging an inner surface of the collection tube upon the collection tube being mounted to the external surface.

17. The collecting device of claim 16, wherein the inclined surface is inclined along a direction being against a direction of removal of the collection tube from the external surface.

18. A method for collecting sap from a tree, comprising:
inserting a hollow conduit into the tree;
securing a collection tube to an end of the conduit by frictionally engaging the collection tube with at least one protuberance on an external surface of the conduit, the at least one protuberance occupying a circumferential extent on the external surface being less than a circumference of the external surface, the external surface being free of protrusions except for the at least one protuberance, the at least one protuberance locally radially deforming the collection tube, a remainder of the collection tube remaining non-deformed so as to form deformed sections and non-deformed sections of the collection tube, an arrangement of the deformed sections and the non-deformed sections configured to reduce rotation of the collection tube about the external surface of the drainage conduit to thereby better secure the collection tube to the drainage conduit; and
draining sap from the tree via the conduit.

* * * * *